(12) United States Patent
Drouet et al.

(10) Patent No.: US 7,571,245 B2
(45) Date of Patent: Aug. 4, 2009

(54) SYSTEM AND METHOD FOR DELIVERING THE STREAMING OF AUDIO-VIDEO USING EXTERNAL RESOURCES

(75) Inventors: Francois-Xavier Drouet, Nice (FR); Vincent Outters, Gattieres (FR)

(73) Assignee: International Business Machines Corporation, Armonk, NY (US)

( * ) Notice: Subject to any disclaimer, the term of this patent is extended or adjusted under 35 U.S.C. 154(b) by 1137 days.

(21) Appl. No.: 11/010,675

(22) Filed: Dec. 13, 2004

(65) Prior Publication Data
US 2005/0135246 A1  Jun. 23, 2005

(30) Foreign Application Priority Data
Dec. 19, 2003  (EP) .................................. 03368115

(51) Int. Cl.
*G06F 15/16* (2006.01)
(52) U.S. Cl. ........................ 709/231; 709/204; 709/223; 709/225; 370/230; 370/235; 370/352; 370/392; 370/328

(58) Field of Classification Search ............. 709/231, 709/204, 223, 225
See application file for complete search history.

(56) References Cited

U.S. PATENT DOCUMENTS

| 2005/0091435 A1* | 4/2005 | Han et al. ................. 710/310 |
| 2006/0161620 A1* | 7/2006 | Ganesan et al. ............ 709/204 |

* cited by examiner

*Primary Examiner*—Jude J Jean Gilles
(74) *Attorney, Agent, or Firm*—Norman Gundel Hoffman Warnick LLC

(57) ABSTRACT

The invention relates to a system and method for dynamically externalizing service delivery with a streaming system in a data transmission system. The method comprises the steps of forwarding at least one user context to an external service infrastructure partner (SIP) device when the streaming system is triggered by an event A; reconfiguring a switch layer when the at least one user context is received by the external SIP to allow user reconnection requests to be rerouted to the SIP; stopping the stream delivery for the at least one user; and restarting the stream delivery by the SIP for the at least one user upon receiving a user reconnection request.

8 Claims, 3 Drawing Sheets

SYSTEM AND METHOD FOR DELIVERING THE STREAMING OF AUDIO-VIDEO USING EXTERNAL RESOURCES

TECHNICAL FIELD

The invention relates to the use of complementary resources when application usage in a data center increases through peaks, and in particular, relates to a system and a method for dynamically delivering the streaming of audio-video using external resources.

BACKGROUND

The primary goal of most Information Technology (IT) systems is to meet required performance and service availability levels for managed applications at the lowest possible cost and risk, while maintaining the highest customer satisfaction. In trying to achieve this goal, the management processes of traditional systems have over-provisioned their data center, particularly when the Internet network has workload levels that vary from relatively predictable to unpredictable (e.g., spiky). Such an over-provisioning includes the dedication of sufficient computing capacity to support each application during its highest potential user demand.

Until now, the reality of over-provisioning has resulted in high costs accompanied with unpredictable service levels, while today's business environment is fast paced and demanding. To be successful and competitive, IT systems must meet business demands by delivering what is needed, where it is needed, and when it is needed. As such, in a dynamic and fluctuating marketplace, new on-demand processes and technologies are required. In today's economy, companies, and in a general way, IT organizations, cannot afford to maintain a server capacity for just-in-case situations, but need optimized and flexible infrastructures.

Different products already exist that constantly monitor service levels, anticipate resource requirements for peak workloads, and then automatically implement the needed services. For example, IBM's Tivoli Intelligent ThinkDynamic Orchestrator can be used to create, customize, and store workflow, personalized with specific policies and procedures, to automate processes in testing and data centers. The execution of these processes can be gradually implemented in a manual, semi-automatic, and finally automatic mode. This allows a company to progress at its own evolutionary pace to become a dynamic and automated on-demand business. However, these products are currently centered on resources they own (resources that have been assigned) and more importantly do not include definitions (workflow) for audio-video service provisioning.

In a data center, computing resources are finite and the business importance of each application varies. For this reason, such products as IBM's Tivoli Intelligent ThinkDynamic Orchestrator only help optimize resource allocation based on the relative importance of each application. For example, a lower priority application for streaming data including audio and/or video may be temporarily shut down while waiting for a higher priority application to be run according to its agreed service levels, until the load falls below the required threshold. As such, users using the streaming service lose their connection, and therefore there is a need for an alternate infrastructure to keep the streaming service active.

SUMMARY OF THE INVENTION

Accordingly, an object of the invention is to provide a system and to achieve a method enabling an external streaming infrastructure to be used when the streaming servers of a data center are supporting other higher priority applications during on-demand peaks.

Another object of the invention is to provide a system and to achieve a method enabling the streaming service of a service provider or a data center to be allocated for other purposes in case dedicated applications need complementary in-house resources.

Another object of the invention is to provide a system and to achieve a method enabling the availability of the streaming services in a service provider or a data center to be maintained when these streaming services require a larger infrastructure to answer greater demands or when the in-house infrastructure requires maintenance or for resiliency including countering security attacks and infrastructure failures.

The invention therefore relates to a method for dynamically externalizing service delivery with a streaming system in a data transmission system in which at least one user computer is connected to an Internet protocol (IP) transport network to transmit requests to and receive data from a plurality of servers through a switch layer and to receive stream delivery from at least one of the servers in charge of handling at least one user context associated with the at least one user. The method comprises the steps of forwarding the at least one user context to an external service infrastructure partner (SIP) device when the streaming system is triggered by an event A; reconfiguring the switch layer when the at least one user context is received by the external SIP to allow user reconnection requests to be rerouted to the SIP; stopping the stream delivery for the at least one user (this may include the step of forwarding timing information to delay the stopping of the stream delivery); and restarting the stream delivery by the SIP for the at least one user upon receiving a user reconnection request.

According to another aspect, the invention relates to a system for dynamically externalizing service delivery with a streaming system in a data transmission system in which at least one user computer is connected to an IP transport network to transmit requests to and receive data from a plurality of servers through a switch layer and to receive stream delivery from at least one of the servers in charge of handling at least one user context associated with the at least one user. The system comprises a dynamic workload (DW) device connected to the switch layer and adapted to perform the steps of forwarding the at least one user context to an external service infrastructure partner (SIP) device when the streaming system is triggered by an event A; reconfiguring the switch layer when the at least one user context is received by the external SIP to allow user reconnection requests to be rerouted to the SIP; stopping the stream delivery for the at least one user; and restarting the stream delivery by the SIP for the at least one user upon receiving a user reconnection request.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE INVENTION

Figure 1:
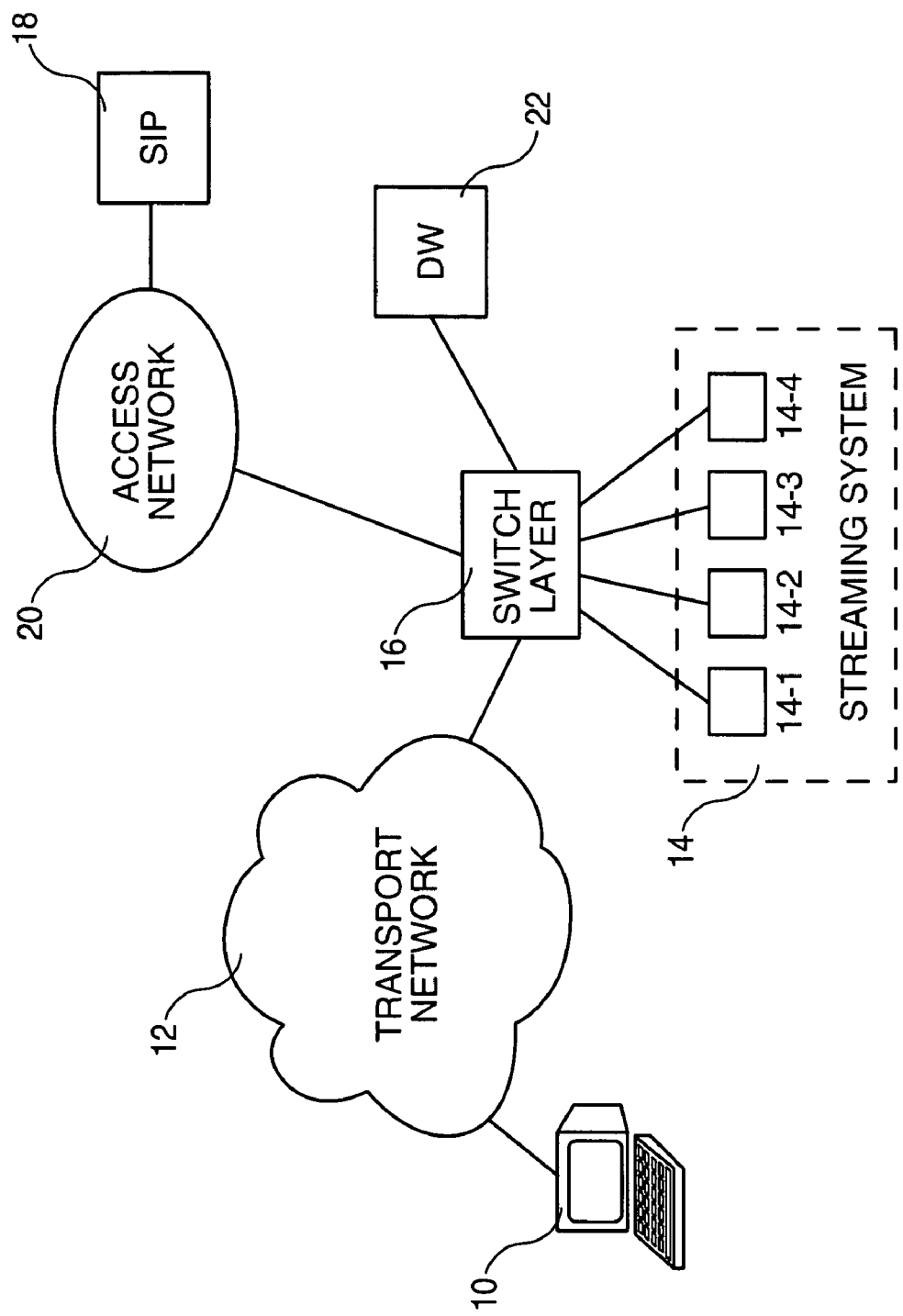
FIG. 1 is a block diagram representing a system for dynamically externalizing the streaming traffic to a service infrastructure partner (SIP) according to the invention.

In reference to FIG. 1, it is assumed that a plurality of hosts such as host 10 can have access to audio and/or video (hereafter referred to as "audio-video") streaming services through an IP transport network 12 by using a streaming system 14.

Hosts 10 preferably can be a personal computer or any user computer equipped with a stream player.

The audio-video services or streaming are composed of two components:
the portal, where users can subscribe to the service and select the audio-video they wish to access; and
the pump or stream server which is responsible to send the audio (such as a song), or the video (such as a movie).

The audio-video is sent to a user computer where it is handled by an audio-video player (or stream player) coupled to the user computer. The audio-video stream is stored as a file on the portal, but is streamed to the stream player which doesn't have at any point of time the full completed file. The purpose of the stream is to send packet per packet and local buffering is used to cope with possible network latency.

There are two possibilities to send audio-video:
the scheduling where the content is sent to several users at a specific time to minimize the usage of the bandwidth, as only one stream is used via multicast. The flow is sent to all the user computers, and the multicast technology is configured at the network level. As such, for the multicast all the routers on the road of the traffic are to be configured; and
the audio-video on demand (UniCast) where the user selects the content he wants to see. In this case, there is one stream per user. The term stream or streaming will refer to audio-video all throughout this description.

The streaming system 14 is composed of a set of servers 14-1, 14-2, 14-3, 14-4 which could be normally any kind of servers but are stream servers in the present invention. The stream servers 14-1, 14-2, 14-3, 14-4 are used to deliver audio-video content. The traffic exchanged through the IP transport network 12 passes through a switch layer 16 which is in charge of connecting the IP transport network 12 and the access network 20 to the streaming system 14. It must be noted that the switch layer 16 is preferably a switch layer 3/4 as well known by those skilled in the art. Moreover, the streaming system 14 can be owned by a service provider or included in the data center of a company.

Assuming that the traffic load can no longer be processed by the streaming system 14, the principle of the invention is to use a service infrastructure partner (SIP) 18, which can be external resources made available as a stream service provided by other lines of business inside the company or another company or a service provider. It is assumed that the SIP 18 is able to deliver equivalent quality of service to the original provider. This includes equivalent audio-video catalogs. The SIP 18 is connected to the switch layer 16 by means of an access network 20 which can be any kind of network such as a wide area network (WAN) or a local area network (LAN), but also a single specialized line. When the installation of re-routing has been completed as described below, a reconnection request from the host 10 is re-routed to SIP 18 by the switch layer 16 via IP transport network 12 and access network 20.

As the solution of delivering the stream by another streaming infrastructure has to be completely transparent to the users, a dynamic workload (DW) device 22 is provided. The DW device 22 is in charge of transferring to the SIP 18 all the data required for ensuring the streaming delivery as soon as it is decided to have the SIP 18 deliver the streaming service. The DW device 22 is also in charge of disconnecting the existing stream connection and reconfiguring the switch layer 16.

Note that the DW device 22 can be triggered to take the actions of service delivery in an automatic way (on the basis of technical and business rules), in a manual way (manual trigger by an operator or as a trigger of an external information such as when the priority has to be given to another service), or a mix thereof.

Figure 2:
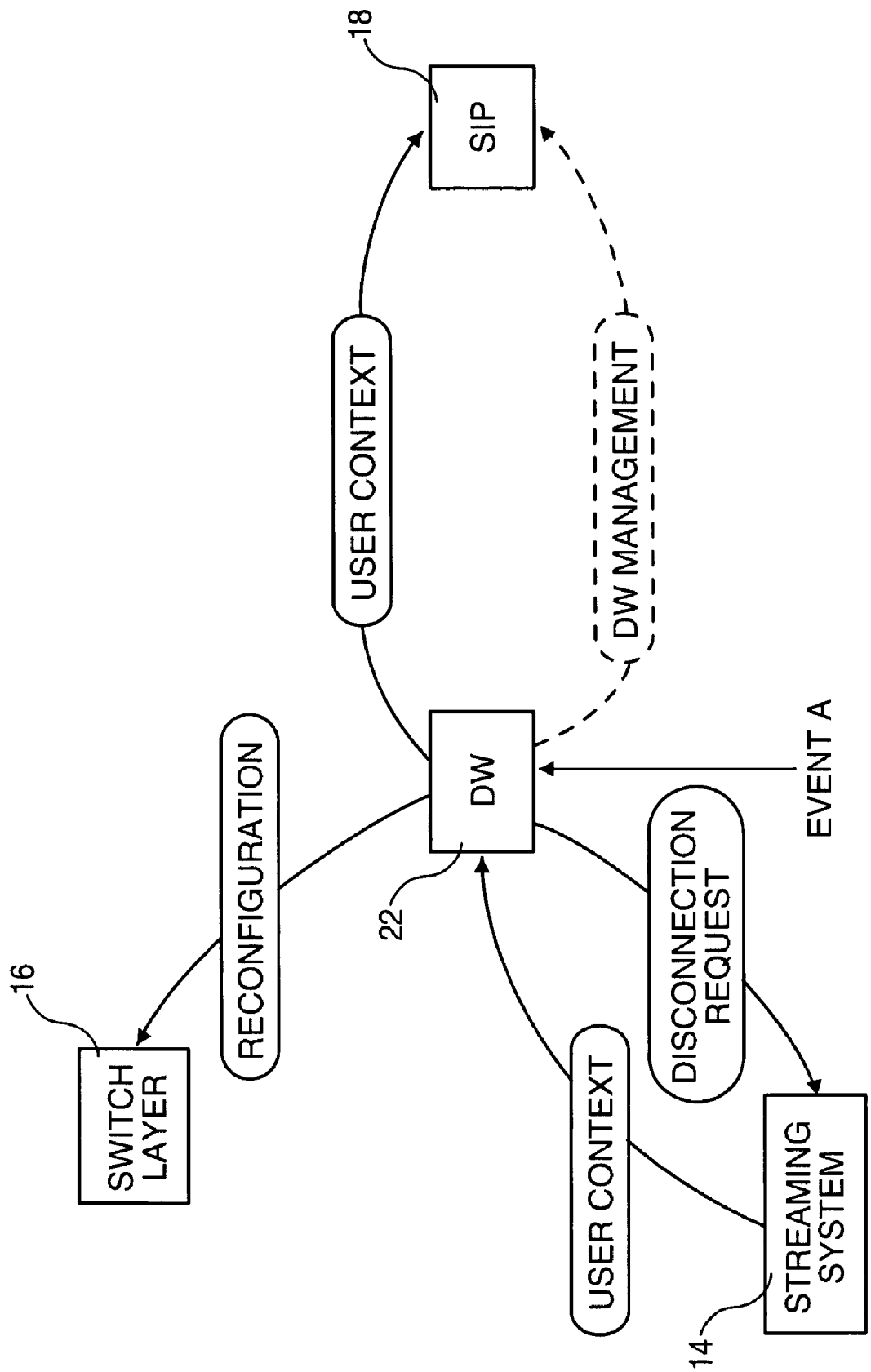
FIG. 2 is a schematic diagram representing the flow of data between the dynamic workload and the other components of the system when the decision of externalizing the streaming traffic is triggered.

As illustrated in FIG. 2, the first step of the method of service delivery according to the invention is the arrival of an event A which is, as mentioned above, a manual or automatic operation triggering the DW device 22 for taking the action of service delivery.

At this stage, it is assumed that the DW device 22 has already received the user context from the streaming system 14 as illustrated in FIG. 2. The user context which is provided by the streaming servers preferably includes:
a list of the names of the stream (audio/video) to be displayed;
the IP address of the user of the user computer;
the status progress of the current stream; and
the service delivery quality parameters (such as the size of the video frame).

When triggered, the DW device 22 forwards the user context as defined above to the SIP 18 whose availability has been checked previously. Then, the switch layer 16 is reconfigured by the DW device 22 in order to be able to send the reconnection request to the SIP 18 when the current stream is disconnected by the DW device 22. Note that the SIP 18 should have a SIP workload management information at its disposal, such information corresponding to all the routing and parameters information. If it is not the case, the DW management is duplicated into the SIP 18.

When the SIP 18 has received all the necessary information as illustrated in FIG. 2, it becomes the active stream infrastructure which delivers the same level of service as the disconnected one.

Finally, at the end of the service delivery set up, the DW device 22 informs any other workload managers or automatic provisioning system of the streaming system 14 that the traffic is now delivered by the new streaming system and that the associated resources that were used by the streaming system 14 can be used for other services.

Figure 3:
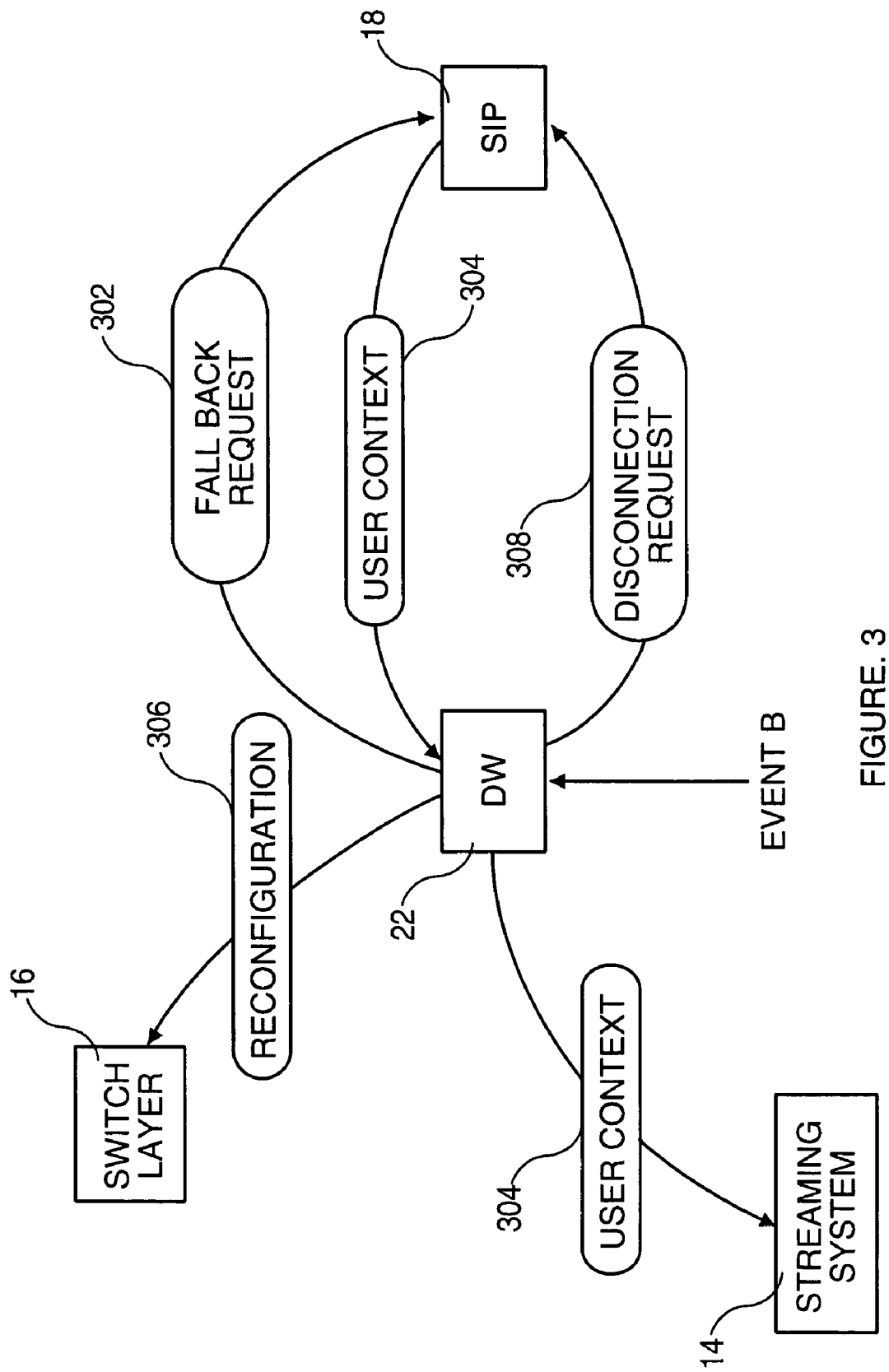
FIG. 3 is a schematic diagram representing the flow of data between the dynamic workload and the other components of the system when the externalizing of the streaming traffic is no longer required.

When it is decided to return to the original situation (e.g., because the traffic decreases) an action referenced as event B triggers the DW device 22 as illustrated in FIG. 3. The following steps are taken:
the DW device 22 informs the SIP 18 (via fall back request 302) to stop delivering streaming service and requests the SIP 18 to forward back the user context 304;
the user context 304 is immediately sent to the streaming system 14 via the DW device 22;
the switch layer 16 is reconfigured (reconfiguration 306) by the DW device 22 so that the reconnection request is no longer re-routed;
the DW device 22 sends a disconnection request 308 to the SIP 18 so the host 10 may try a new reconnection to the streaming system 14.

The invention claimed is:

1. Method for dynamically externalizing service delivery with a streaming system in a data transmission system in which at least one user computer is connected to an Internet protocol (IP) transport network to transmit requests to and receive data from a plurality of servers through a switch layer and to receive stream delivery from at least one of the servers in charge of handling at least one user context associated with the at least one user, the method comprising:

forwarding the at least one user context to an external service infrastructure partner (SIP) device when the streaming system is triggered by a first event, wherein the first event is a manual action from an operator or an automatic action based on technical or business rules;

reconfiguring the switch layer when the at least one user context is received by the external SIP to allow user reconnection requests to be rerouted to the SIP;

stopping the stream delivery for the at least one user computer; and restarting the stream delivery by the SIP upon receiving a reconnection request from the at least one user computer.

2. Method according to claim 1, wherein forwarding user context further comprises forwarding timing information to delay the step of stopping the stream delivery.

3. Method according to claim 1 wherein the at least one user computer comprises a stream player to initiate a reconnection request.

4. Method according to claim 1 wherein a dynamic workload (DW) device is in charge of forwarding the user context to the SIP device and reconfiguring the switch layer.

5. Method according to claim 4, wherein the dynamic externalization of service delivering is performed when the DW device is triggered by the first event.

6. Method according to claim 4 wherein the system returns to its original operation when the DW device is triggered by a second event, wherein the DW device takes the following actions when triggered by the second event:

the DW device informs the SIP to stop delivering stream service and requests the SIP to forward back the user context:

the user context is immediately sent to the stream system via the DW;

the switch layer is reconfigured by the DW device so that the reconnection request is no longer re-routed; and the DW device sends a disconnection request to the SIP so the user computer may try a new reconnection to the stream system.

7. Method according to claim 1 wherein the switch layer is a switch layer 3/4.

8. System for dynamically externalizing service delivery with a streaming system in a data transmission system in which at least one user computer is connected to an IP transport network to transmit requests to and receive data from a plurality of servers through a switch layer and to receive stream delivery from at least one of the servers in charge of handling at least one user context associated with the at least one user, the system comprising means for forwarding the at least one user context to an external service infrastructure partner (SIP) device when the streaming system is triggered by a first event, wherein the first event is a manual action from an operator or an automatic action based on technical or business rules;

means for reconfiguring the switch layer when the at least one user context is received by the external SIP to allow user reconnection requests to be rerouted to the SIP;

means for stopping the stream delivery for the at least one user computer; and means for restarting the stream delivery by the SIP upon receiving a reconnection request from the at least one user computer.

* * * * *